United States Patent [19]
Mayer

[11] Patent Number: 6,009,481
[45] Date of Patent: *Dec. 28, 1999

[54] MASS STORAGE SYSTEM USING INTERNAL SYSTEM-LEVEL MIRRORING

[75] Inventor: Robert Mayer, Brighton, Mass.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/720,542

[22] Filed: Sep. 30, 1996

[51] Int. Cl.⁶ ........................................... G06F 11/00
[52] U.S. Cl. .................................. 710/33; 710/3
[58] Field of Search ..................... 711/113, 114, 711/112, 131, 150, 129; 371/2.1; 710/3, 100; 714/6, 4; 707/204; 713/340; 395/425

[56] References Cited

U.S. PATENT DOCUMENTS

| | | | |
|---|---|---|---|
| 4,722,085 | 1/1988 | Flora et al. | 714/770 |
| 4,905,141 | 2/1990 | Brenza | 711/129 |
| 5,212,784 | 5/1993 | Sparks | 395/182.04 |
| 5,228,135 | 7/1993 | Ikumi | 711/131 |
| 5,230,073 | 7/1993 | Gausman et al. | 707/3 |
| 5,291,442 | 3/1994 | Emma et al. | 395/425 |
| 5,297,258 | 3/1994 | Hale et al. | 711/114 |
| 5,303,362 | 4/1994 | Butts, Jr. | 395/425 |
| 5,390,313 | 2/1995 | Yanai et al. | 711/112 |
| 5,392,244 | 2/1995 | Jacobson et al. | 711/114 |
| 5,423,046 | 6/1995 | Nunnelley et al. | 395/750.07 |
| 5,432,922 | 7/1995 | Polyzois et al. | 395/182.04 |
| 5,435,044 | 7/1995 | Cox et al. | 707/205 |
| 5,566,315 | 10/1996 | Milillo et al. | 711/113 |
| 5,586,248 | 12/1996 | Alexander et al. | 395/182.2 |
| 5,727,167 | 3/1998 | Dwyer, III et al. | 395/280 |
| 5,742,792 | 4/1998 | Yanai et al. | 395/182.03 |

*Primary Examiner*—Ahmad F. Matar
*Assistant Examiner*—Khanh Quang Dinh
*Attorney, Agent, or Firm*—John M. Gunther, Esq.; Leanne J. Fitzgerald, Esq.

[57] ABSTRACT

A mass storage system having at least one input/output controllers in connection with a host computer is disclosed. The mass storage system also includes mirrored storage devices in connection with the input/output controllers through a global cache memory. Each mirrored pair of storage devices is assigned a common logical volume address, but is looked upon by the host computer as a single entity. The cache memory includes dynamically allocable cache slots, which correspond to each common logical volume address. When the host wishes to write data to a pair of mirrored storage devices, the contents of first write operation are written into the appropriate cache slot. However, when a second write operation is received by the input/output controllers, a determination is made as to whether the contents of the second write operation are already in the cache memory. If the contents are in the cache memory, a second write operation is not effectuated, thus improving system performance, but maintaining reliability in the system.

11 Claims, 5 Drawing Sheets

MASS STORAGE SYSTEM USING INTERNAL SYSTEM-LEVEL MIRRORING

FIELD OF THE INVENTION

This invention relates to the field of mass storage of data on disk drives and the like. More particularly, it relates to digital data storage systems that provide redundant storage by mirroring data on a plurality of disk drives.

BACKGROUND OF THE INVENTION

Many approaches have been developed for protecting critical data stored in digital data systems against loss resulting from incidents such as power failure or power transients, equipment malfunction, human error or other events of comparable effect. In one approach, normal operations on a data processing system are stopped so that all or selected portions of the data stored on a particular drive (e.g., a disk drive) can be transferred to a backup medium, such as a magnetic tape, thereby to backup the memory system by providing a "snapshot" of the memory system at the time of the backup. Successive backups may then either copy onto the backup media the entire contents of the memory system or only the incremental changes that have been made since the prior backup.

This approach is still used in data processing systems. However, even in personal computer systems, the time to complete such a backup may require an hour or more. It may also take a significant time to restore the information from the backup medium following a failure of the primary storage system, particularly if a storage system, such as a disk drive, fails completely. While such approaches may be acceptable for providing redundancy in home and small office systems, in recent years there has arisen another category of data processing systems that requires essentially full-time availability of the data and that incorporates large memory systems. Conventional backup procedures simply cannot be used with such systems without introducing significant service interruptions that can lead to unacceptable intervals during which the data processing system is not available for its normal operations.

In such systems, the data storage system often includes multiple disk controllers, each having the capability of controlling multiple disk drives or other storage units. In some prior art systems, not only is a data file written to a specific disk drive, as a primary disk drive, through its corresponding disk controller, but also the file is written to another disk, as a secondary disk drive, connected to the same or another disk controller. This provides full redundancy. However, the "host" data processing system serviced by this mass storage subsystem must perform two writing operations instead of one. If there is a single communications path between the host system and the mass storage subsystem, these write operations must be performed sequentially. The need to execute sequential operations can affect both the performance and operation of the data processing system. For example, each copy of the data to be stored may be written randomly on each disk using the available parts of the media, as a result of which the file can become significantly fragmented. This condition, in turn, can produce undesirably long retrieval times. Moreover, in such systems, all normal reading operations involve the primary disk drive. No attempt is made to read from the secondary disk drive unless a problem occurs in the primary disk drive. This is somewhat dangerous in as much as the condition of the data on the secondary disk drive is unknown until it is needed and if it is not error-free at that time, there is no other source from which to retrieve the needed file.

U.S. Pat. No. 5,390,313 issued to Yanai, et al., and assigned to the assignee of this application, discloses a data storage system with data storage redundancy. The system includes at least one pair of disk storage devices. Each device has a plurality of generally identical data records. These are "mirrored" disks or storage media. Each medium includes position indicators for providing one or more indications of rotational position of each of the rotating data storage media with respect to its associated fixed position read/write mechanism. A position monitor receives the rotational position indications from each rotating data storage medium and computes and monitors the rotational position of each rotating storage medium with respect to its associated read/write mechanism. After receiving a request for access to one or more data records stored on the pair of rotating data storage media, the system computes projected data access times for retrieving the requested data record on each of the rotating data storage media and commands retrieval of the requested data record to the rotating data storage medium having the shortest projected data access time based upon rotational position in state of the respective data storage medium. Consequently, unlike the previously discussed file copy systems, data can be, and is, read from either of the mirrored memories.

U.S. Pat. No. 5,212,784 issued to Sparks, discloses another type of automated backup system in which separate logical buses couple at primary controllers to release a set of paired mirrored memories or shadowed primary data storage devices. A backup device controller attaches to one of the logical buses and a backup device. In normal operation, the primary controller writes data to both the primary data storage devices to produced mirrored copies. The backup device controller transfers data that is read from a designated one of the primary data storage devices to the backup storage device. After backup is complete, the primary controller re-synchronizes the primary data storage devices so that data that has been written on the continuously operational data storage device is copied onto the designated data storage device. In an alternative embodiment, separate logical buses couple the primary controller to at least a set of triplet or quadruplet mirrored or shadowed primary data storage devices. Triplet devices permit backup operation while retaining the redundancy characteristic of the mirrored storage devices. Quadruplet devices permit continuous backup operations of two alternating storage devices retaining the redundance characteristic of mirrored storage devices.

U.S. Pat. No. 5,423,046 issued to Nunnelley et al. discloses a high capacity data storage system with a large array of small disk files. Three storage managers control (1) the allocation of data to the array, (2) access to the data and (3) the power status of disk files within the disk array. More specifically, the allocation manager controls, inter alia, the type of protection desired to include redundancy by mirroring. The access manager interprets incoming read requests to determine the location of the stored data. That is, the access manager determines which cluster or clusters in the data memories contain the requested data set and then passes that cluster list to the power manager. The power manager determines which disk files must be activated to fulfill the request.

U.S. Pat. No. 5,392,244 issued to Jacobson et al. discloses memory systems with data storage redundancy utilizing both mirroring and parity redundancy. The memory system places more critical data in the parity area. Consequently the system effectively tunes the storage resources of the memory system according to the application or user requirements. Alternatively the tuning can be made on the basis of accesses to the data such that the mirrored areas store recently accessed data while the parity raid area stores the remaining data.

U.S. Pat. No. 5,432,922 issued to Polyzois et al. discloses a storage system using a process of alternating deferred updating of mirrored storage disks. Data blocks or pages to be written are accumulated and sorted into an order for writing on the disk efficiently, The individual disks of a mirrored pair arc operated out of phase with each other so that while on disk is in the read mode the other is in the write mode. Updated blocks arc written out to the disk that is in the write mode in sorted order. Read performance is provided by directing all read operations to the other disk, that is in the read mode. When a batch of updates has been applied to one disk of a mirrored pair, the mirrored pair switch their modes and the other disk, that had been in the read mode is updated.

U.S. Pat. No. 5,435,004 issued to Cox et al. discloses yet another redundant storage variant. A computerized data backup system dynamically preserves a consistent state of primary data stored in a logical volume of a disk volume management system. A file system command invokes a cloning of the logical volume, thereby reserving a portion for shadow-paged blocks. A read/write translation map establishes a correspondence between incited and shadowed pages in a reserved portion. Upon generating a read command for a page in a logical volume, a map search detects that a shadowed page is allocated to the shadowed page blocks corresponding to the page and effects the read. Backup occurs while the system is operating, thereby facilitating reading from the non-shadow page blocks during such a backup.

In still another system that has been utilized by the assignee of this invention, each of two mirrored individual disk drives, as physical disk volumes, are divided into blocks of consecutive tracks in order. Typically the number of tracks in each block is fixed and is not dependent upon any boundary with respect to any file or data stored on the blocks. A typical block size might include four tracks. Assume for purposes of explanation that the blocks were numbered consecutively (i.e., 0, 1, 2, . . . ), with block 0 comprising tracks 0 through 3; block 1, tracks 4 through 7; etc. During each reading operation, the data system reads all data from odd-numbered blocks (i.e., blocks 1, 3, . . . ) from the first mirrored physical disk drive and all the even-numbered blocks (i.e., blocks 0, 2, 4 . . . ) from the second mirrored physical disk drive. However, when a read operation recovers a data block that resides on consecutive blocks of tracks, for example, track blocks 1 and 2, the reading operation from the first physical disk drive must stop at track 7. Then the second disk drive must move its head to the appropriate track, track 8 on this example, to retrieve the next block. This interval, or "seek time", and a corresponding "latency", that represents the time required for the beginning of a track to reach a read/write head, determines the total access time. By contrast, continuing the reading operation with the first disk drive might introduce a one-track seek time and one-revolution latency. Such a total access time will interrupt the transfer and can significantly affect the overall rate at which data is transferred from the physical disk drives.

Collectively the foregoing prior art discloses various approaches for minimizing the risk of data loss in a data processing system, particularly through the use of mirrored memory devices. This prior art also discloses various approaches for enabling reading operations from both physical disk drives in a mirrored pair. However, in these systems the decision on which of the mirrored pair will be used during a reading operation rests generally on the physical attributes of the disk drive rather than the data content of the drive. For example, the assignee's prior art system divides the physical drive into arbitrary blocks of continuous disk tracks and then interleaves the reading operations according to the location of the data on a particular track. Another of the assignee's system selects a particular one of the mirrored physical disk pairs based upon the time it will take to initiate an actual transfer. Still others make a determination based upon whether one or the other of the mirrored disk pair is involved in a backup operation, in which case the reading operation is caused to occur from the other physical disk drive. Experience is demonstrating that while these approaches work effectively in some environments, they can actually slow the effective transfer rate of a particular block of data as defined in a file or in a like block in other environments that are now becoming more prevalent in commercial applications.

In yet another system that has been utilized by the assignee of this invention, physical disk drives in a mirrored pair are divided into logical volumes such that the mirrored logical volumes have identical data structures within the physical disks. A memory controller responds to the read command and includes a correspondence that assigns to each logical volume the identity of one of the first and second physical disk drives from that logical volume. A data transfer controller responds to a read command by transferring the data in the logical volume from the identified physical disk drive that the correspondence assigns to the logical volume.

In accordance with another aspect of that system, there is provided a data processing system which includes, as components, at least one host adapter, a system memory including buffer memory, a command memory and a memory manager, first and second disk drives from which data is read, and first and second device controllers for controlling transfers with the first and second disk drives and interconnecting the first and second disk drives. A system thus interconnects these components. The host adapter includes a system memory manager the effects the transfer of a read command to the command memory over the system bus. Each of the first and second disk drives is divided identically into a plurality of logical volumes comprising a number of contiguous tracks, whereby the first and second disk drives are mirrors of each other. Each device controller includes a memory manager for controlling transfers between the corresponding device controller and the system memory. A buffer in each device controller stores data being transferred with the disk drive and a control connects to the buffer for controlling transfers between the disk drive and buffer. A correspondence table comprises an entry for each logical volume connected to the device controller. Each entry includes a read mode field and the control responds to the receipt of a read command by identifying a logical volume by using the corresponding table to connect the drive control for affecting a transfer from the connected one of the mirrored disk drives when the read mode field has a first value and for excluding any response when the read mode field has a second value.

In general, therefore, there will be seen to be two goals addressed with respect to the performance of such mass storage systems: (1) to increase reliability of data storage and retrieval and (2) to improve data availability—i.e., to reduce the time required to access and retrieve or store data. With these goals in mind, let us consider specifically the most appropriate of the architectures discussed above.

Turning to FIG. 1, there is shown a so-called RAID (standing for redundant array of independent disks) level 1 approach (see The RAID Primer: An Introduction to RAID Technology (First ed.), The Raid Advisory Board, Inc., 13 Marie lane, St. Peter, Minn. 56082-9423, March, 1994, incorporated by reference herein). In a RAID level 1 system, such as that shown at 10, a pair of drives is provided but presented to the host 14 as but a single drive. The write data is written to both drives and can be read from either drive. That is, each drive is mirrored to another (in the Figure, the only other) drive, the mirroring drive being "invisible" to the host processor which is storing data to or retrieving data from the mirrored drive. Thus, the host system sees the storage subsystem as a single "black box;" the drive mirroring is accomplished out of view of the host, inside the black box. The host issues only one write command or one read command; it does not have to manage the mirrored drives separately. The drive controller (also called a drive adaptor) manages the drives for the host.

In FIG. 1, an (optional) read/write memory cache 16 is interposed between the host processor 14 and the mass storage subsystem 10. All read and write operations are funneled through the cache; indeed, through a single cache location in common for both drive members of a mirroring pair. This is illustrated figuratively in FIG. 1 by the dashed lines inside the cache, indicating the write path passes through the cache 16 and the cache then sends a copy of the write data to both of drives 11 and 12 (either sequentially or concurrently). It will be understood by those skilled in the art that a drive controller must be present, also, to control each drive; but the drive controllers are not shown to simplify the discussion.

Note that this system is vulnerable to a single failure at several points, including the host/drive interface, the drive or system controller, and the cache memory. Since, as stated above, one of the principle objectives of mirroring is to increase reliability, a corollary is that reliability is that it is desirable to eliminate such single-point failure possibilities.

With attention to FIG. 2, this is achieved by systems which provide a redundant interconnection between the host system 14 and the storage subsystem 20, allowing the host to access directly each of the (mirrored and mirroring) drives (22-1 through 22-T, where there are T drives present) in the storage subsystem. Each interconnection is accomplished via a system adaptor, or controller, labeled SA, 24 and 25 (only one exemplary controller being shown). Indeed, each drive may be controlled by its own, separate controller, DA, as well. Failure of one controller or one interconnection will not cause the entire mass storage system to fail. In this type of arrangement, the host system itself typically will control and effectuate the mirroring operation. That is, when the host has a block of data to be stored in the mass storage system, it separately writes the data to each of the two or more mirrored drives, first writing to one of the drives via a first connection, first system adaptor or controller, SA, and first path through cache memory (if cache is employed) to a first disk controller; then via a separate interconnection and separate controllers to the other disk drive(s) in the mirroring arrangement. The host has the responsibility of monitoring and maintaining the individual drive conditions within the storage subsystem.

Thus, if a write operation fails with respect to a specific block of data for a particular drive in a mirrored pair of drives, the host must make another attempt to write to the drive that failed the operation. If appropriate, the host may have to first read the data from another drive. Pending resolution of the failure, when the host desires to read that data from the mass storage system, it must ensure that the data block is read from the one of the drives that had correctly executed the write operation. The host, therefore, must keep track of the data that is valid and invalid on each drive. It also must, when a failed mirror drive or controller is replaced, initiate and supervise the process of writing to that mirror drive the information which the system expects to be present there. This may require that the host read the missing data from another of the paired mirror drives so that it can then be written to the drive whose contents must be updated.

This arrangement, therefore, imposes considerable overhead on the host processor, on the various controllers involved in the operations, and on the communications interface between the host and the storage subsystem. When the storage subsystem includes a cache which is duplicated for each mirrored drive, further overhead may be created: for example, two write operations to the cache will result in two writes pending in the cache and to be executed and cleared separately. That is, overhead and performance have been sacrificed somewhat to achieve higher reliability.

Accordingly, there exists a need for a drive-mirroring mass storage system with both high performance and high reliability, and achieving reduced operational overhead. This system should be usable with RAID architectures as the same are becoming popular and widely employed.

SUMMARY OF THE INVENTION

In the present invention, which addresses this need, there is provided a mass storage architecture and method of operation usable in or on a number of platforms, such as the Symmetrix line of integrated cached disk arrays of EMC Corporation of Hopkinton, Mass. (The Symmetrix product line of integrated cached disk arrays is described in numerous publications from EMC Corporation, including without limitation Symmetrix Model 55xx Product Manual, P/N 200-810-550, Rev. E, April, 1995, which is hereby incorporated by reference.) The system employs multiple system adaptors (i.e., controllers) through which the host data processor and the storage system communicate, mirrored pairs of drives, each drive having its own associated drive adaptor (i.e., controller), a memory (i.e., high-speed electronic memory) accessible to all of the controllers and a communication system for coupling the controllers and tile memory. Mirrored pairs of drives are treated in the storage subsystem as a single logical drive volume but appear to the host as separately addressable. Part of the memory is dedicated to use by the controllers as mailboxes. The controllers can post messages to one another in these mailboxes and each controller on some predetermined basis examines its mailbox and executes one of the operations which had been posted to it. Another part of the memory is used as a globally accessible read-write cache. A single entry, or location, in the cache is employed to service both physical drives of a mirrored pair (or, more generally, the drives of a mirrored tuple, as a drive may have more than one other mirroring drive, though for the sake of simplicity mirroring is generally discussed herein in terms of just two mirroring drives being paired), with one cache able representing the single logical drive volume. Thus to execute a write operation the host need only write the data to a single cache table entry. The individual drive adapters (i.e., controllers) for the respective mirrored drives then read the data from the cache and write it onto heir associated drive's storage medium.

The host communicates with each of a pair of mirrored drives through a separate path. Since there are multiple communication paths from the host into the storage subsystem, it will be appreciated that the host will deliver the write instruction to one system adapter before it gets to another. A process is provided for allowing the first system adapter which is ready to do so to execute the writing of the data block into the memory cache. That is, this process distinguishes reliably between write operations which have and have not already been executed. According to this process, a counter is provided in the cache, for each system adapter that can address the cache. The states of the counters indicate the state of a given cache memory "slot"—i.e., location—relative to each of the system adapters.

The structure and operation of the invention will be more readily understood from the detailed description which follows, which detailed description should be read in conjunction with the accompanying drawing figures.

DETAILED DESCRIPTION

Figure 1:
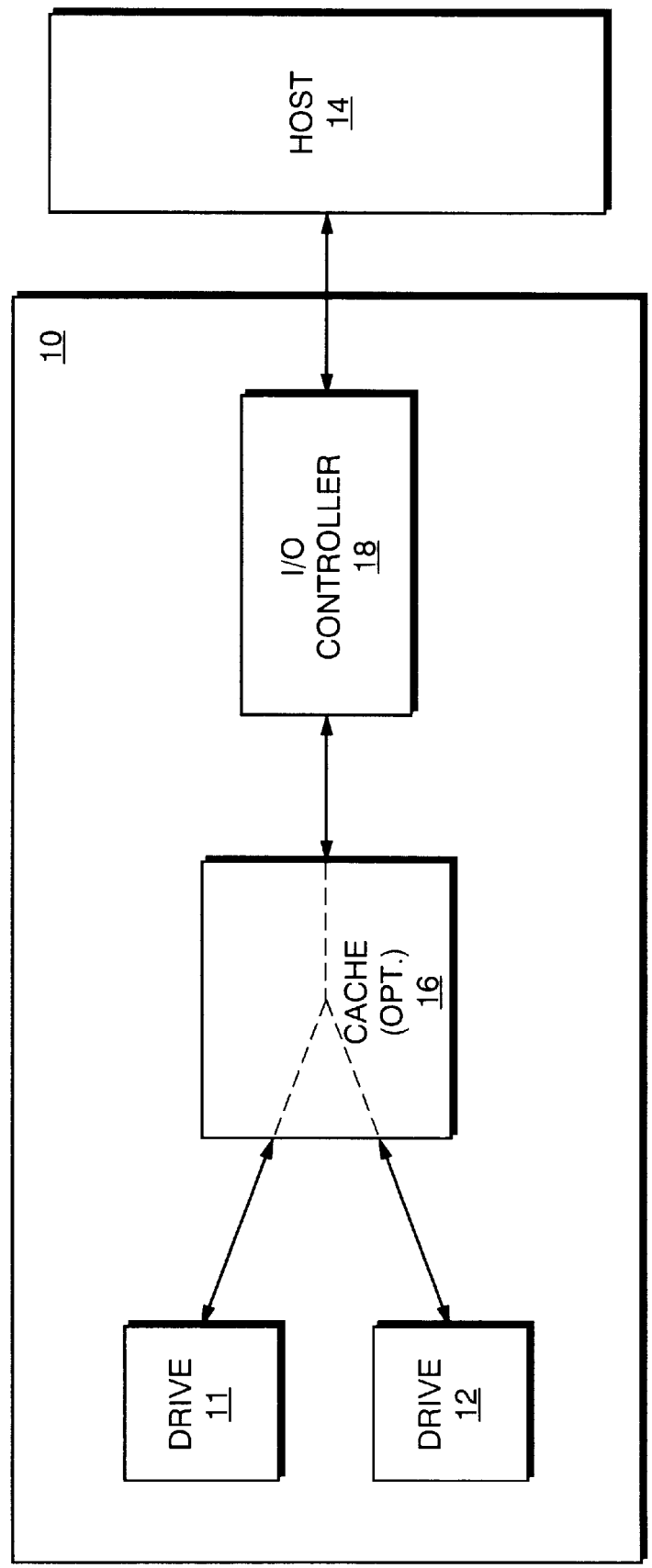
FIG. 1 is a diagrammatic illustration of a prior art data processing system employing a RAID type of mass storage system and illustrating the data writing path from a host via a cache memory to a pair of mirrored drives.
Figure 2:
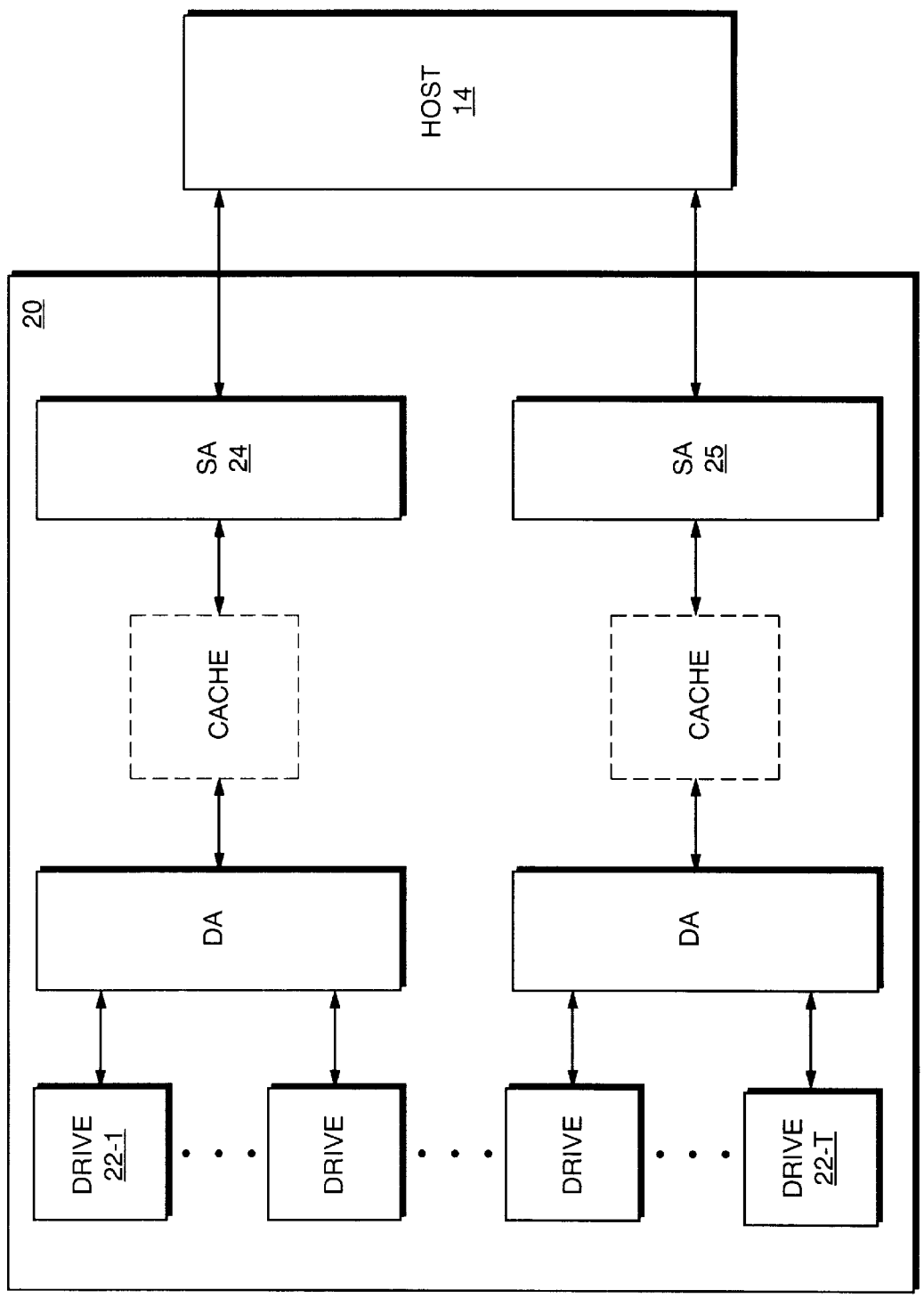
FIG. 2 is a diagrammatic illustration of a prior art data processing system employing system-level (i.e., host-controlled) mirroring to store data redundantly.
Figure 3:
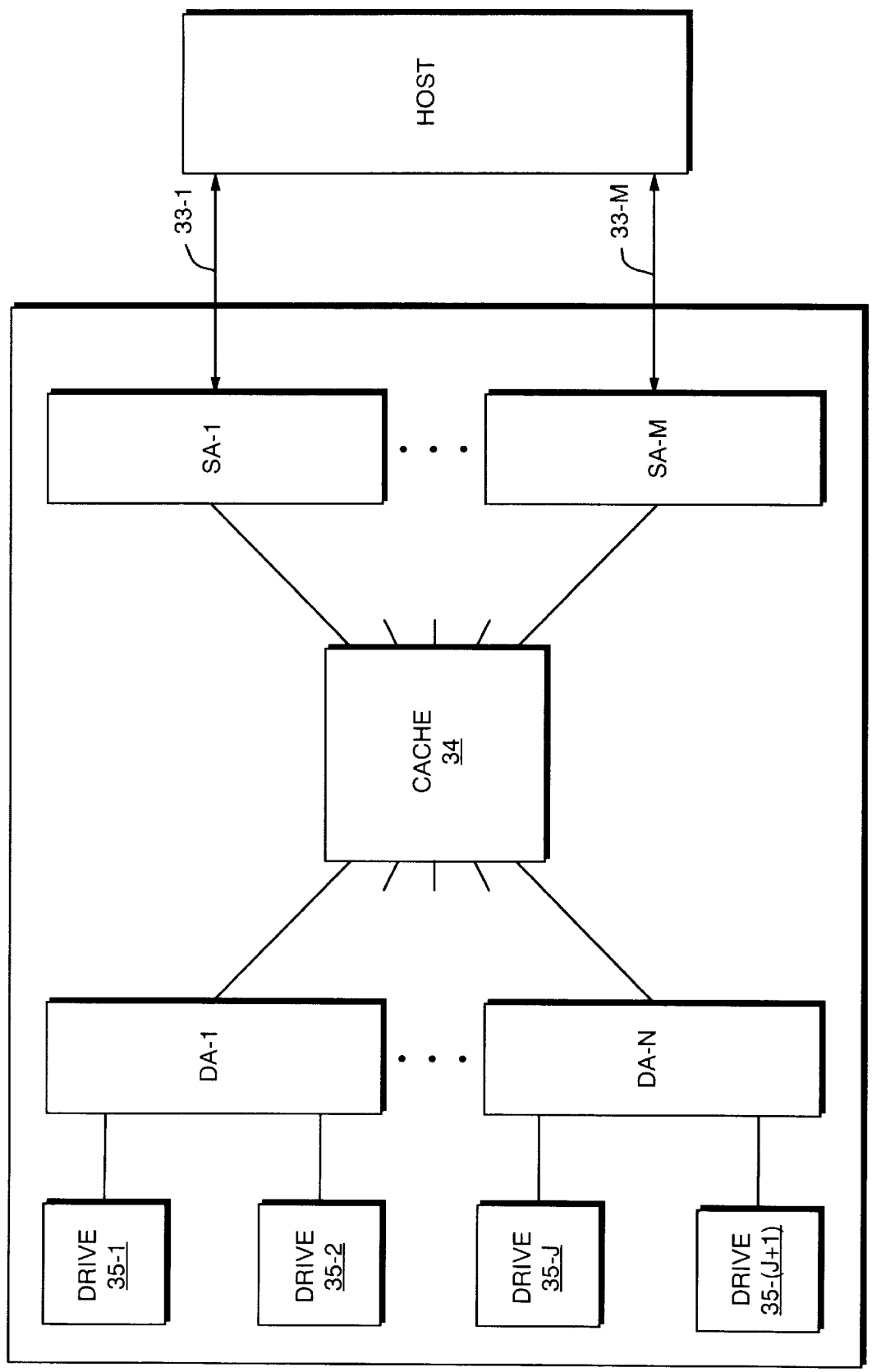
FIG. 3 is diagrammatic illustration of an exemplary data processing system in which the present invention may be embodied, exemplifying a Symmetrix mass storage system from EMC Corporation of Hopkinton, Mass.

FIG. 3 illustrates a system such as a Symmetrix mass storage system or subsystem 30 of EMC Corporation of Hopkinton, Mass., in which the present invention is usefully employed. (Further details of this exemplary storage subsystem will not be discussed here, to avoid obfuscation of the invention. However, the following publications are incorporated by reference as disclosing additional details of the Symmetrix system: Symmetrix Model 55xx Product Manual, P/N 200-810-550, Rev. E, April, 1995.) A host data processor 32 employs the storage system 30 to retain large amounts of data. The mass storage system includes a plurality of M system input/output (I/O) adapters (also called controllers), or SA's, SA-1 through SA-M, a plurality of N drive adapters (also called controllers), or DA's, DA-1 through DA-N and a global cache memory 34. Note that the various controllers and the cache memory are all interconnected via a bus or communications mechanism, not shown to avoid obfuscation. The host communicates with the storage system via the SA's. For convenience, the interface between the host and the storage system may conform to an industry-standard interface specification such as the Small Computer System Interface, or SCSI—pronounced "scuzzy"—standard. The DA's similarly may use industry-standard interfaces.

The SA's provide the electrical communication with the host and write received data to the cache memory. They also alert the DA's that there is data in cache waiting to be written to disk. When a read operation is to be performed, the SA's retrieve the data from cache (either directly, if it is in cache, or indirectly, after a DA obtains it from disk and places it in cache).

Figure 4:
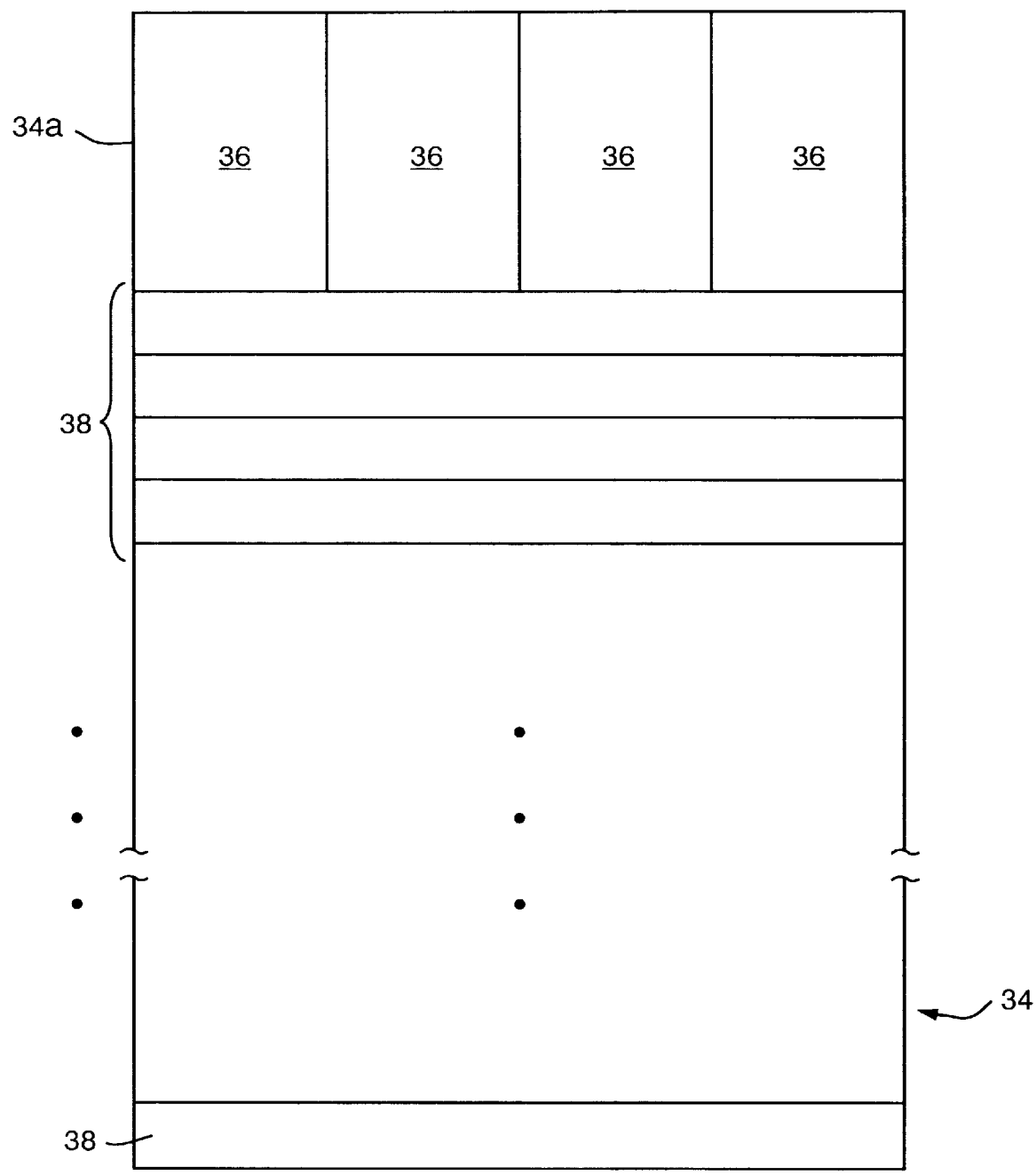
FIG. 4 is diagrammatic illustration of an exemplary cache memory according to the invention.

A first expanded view of the cache memory is shown in FIG. 4. Cache 34 contains a first section 34A in which there are established a number of tables 36 and a second section 34B in which there are slots, or locations, 38 for holding read/write data blocks. The information in the tables 36 define completely the characteristics and status of each drive serviced by the cache as well as identifying (i.e., pointing to) the slots allocated to hold data for that drive. In a typical large-scale storage system which contains on the order of 100 drives of about 4 to 9 GB capacity each, the cache can get quite large. For example, a 4 GB cache may typically be provided, about 30 MB per disk drive. The amount of data storage available in the cache is the total amount of cache memory less the memory occupied by the cache tables. Consequently, reducing the size of cache tables and efficient use of the cache memory is important to maximizing the data capacity and performance of a cache of a given size.

RAID storage systems use smaller cache tables than do systems employing system-level mirroring (SLM), but in the process, they lack the channel redundancy of SLM. Thus SLM systems provide increased reliability as compared with RAID, but trade off against that gain decreased performance (i.e., data throughput per unit time, other factors such as data transfer rates being equal).

Cache memory 34 comprises a globally available pool of memory, the cache slots 38, for caching write data to drives 35-k (where "k" is merely an index variable) and read data from those drives. In the table area 36 of the cache 34, for each logical drive volume serviced by the cache unit, there is a device table 46-p ("p" being an index variable) containing parametric data defining characteristics of the drive. For example, a table 46-A has a header containing, inter alia, a logical volume identifier 48 and parametric data 49. Secondly, there is for each device a collection of cylinder tables 50-1 through 50-N, which are used by the various I/O and drive adapters to (1) map I/O data to specific slots in the data area 38. The number of cylinder tables equals the number of cache slots in the data portion. Cache slots are allocated dynamically, as they are needed. When a block of data is to be written to cache, an entry is made in the appropriate cylinder table, pointing to the physical cache slot where the data is held.

As previously noted, the cache is global in that it is available to all system adapters and all drive adapters and the same physical memory is usable for write caching and for read caching. Since the total amount of memory in the cache area is fixed, memory used for write caching is not available for read caching. In most situations, overall system performance will be more heavily impacted by longer read latencies than by longer write latencies, so it is important that the amount of memory used for write caching not consume cache memory too aggressively in this arrangement.

Referring back to FIG. 3, the present invention is indistinguishable at the block diagram level from the system discussed there as a prior art SLM system. However, unlike the prior art, a collection of mirrored drives is addressed by the host as a single logical volume and the interaction of the controllers with the cache provides the translation from logical to physical addressing of the drives and the requisite control to achieve high performance, as well.

As illustrated, a host system 32 communicates with storage system 34 via first connection (i.e., channel) 33-1 and second connection 33-M. The host operates as though it is connected to a prior art storage subsystem. Thus the host executes a pair of write operations to the first and second drives in a mirrored pair, such as drives 35-1 and 35-J. Those two drives constitute but one logical volume which shall be called V1. A first write to drive 35-1 is transmitted via connection 33-1. A short time later, a second write to drive 35-J is transmitted via connection 33-M. Assume the first write command is received by controller SA-1. As both of drives 35-1 and 35-J constitute a single logical volume V1, they are assigned a single cache slot 38-V1. A translation table 48, addressed using the physical drive name, contains a pointer to direct the write to slot 38-V1, so the write data block is written by SA-1 to slot 38-V1. In contrast with SLM systems as described above, though, when the second write is received by controller SA-M, it, too, is directed to slot 38-V1. However, there is no need to write the data block to the cache, since it is already there. Accordingly, it may be discarded. (Discarding does not have to involve a physical operation. It may involve the lack of an operation—writing to the cache, that is.) System Level Mirroring is inefficient to the extent it separately and independently processes both write messages. According to the present invention, this is unnecessary.

In the cache memory there is a mailbox area for each controller. Messages containing instructions for the controllers are queued in these mailboxes by the other controllers. Each controller monitors its mailbox and executes the appropriate operations in response to receiving these messages. As soon as data is written to the cache for a write cache operation, a message is sent by the SA to the intended DA's, which are identified by logical or physical address. Both DA's servicing the intended drives then read the cache and write the data to their drives. In a conventional manner, flags are set and cleared appropriately in the cache to signal the status of each slot.

Should one of the SA's or the associated connection fail, this would be duly noted and serviced conventionally, while all I/O continues without interruption via the second SA and I/O channel.

Since no slot is allocated in response to the arrival of the second one of the write messages generated by the host, the amount of memory used for write caching is half that used by a comparable SLM system. Moreover, the overall operation of this write caching architecture places less overhead on the system since the second write to the mirrored pair is ignored as redundant and no processing thereof is required once the operation is found to be such a second write. It cannot be assumed, however, that the next received message at a mirror port after a first such message is the corresponding mirror write. Other messages may intervene due to the vagaries of processing. How, then, is a mirroring write message detected and how is it ensured that only mirror write messages and no other messages are "discarded" or ignored?

Figure 5:
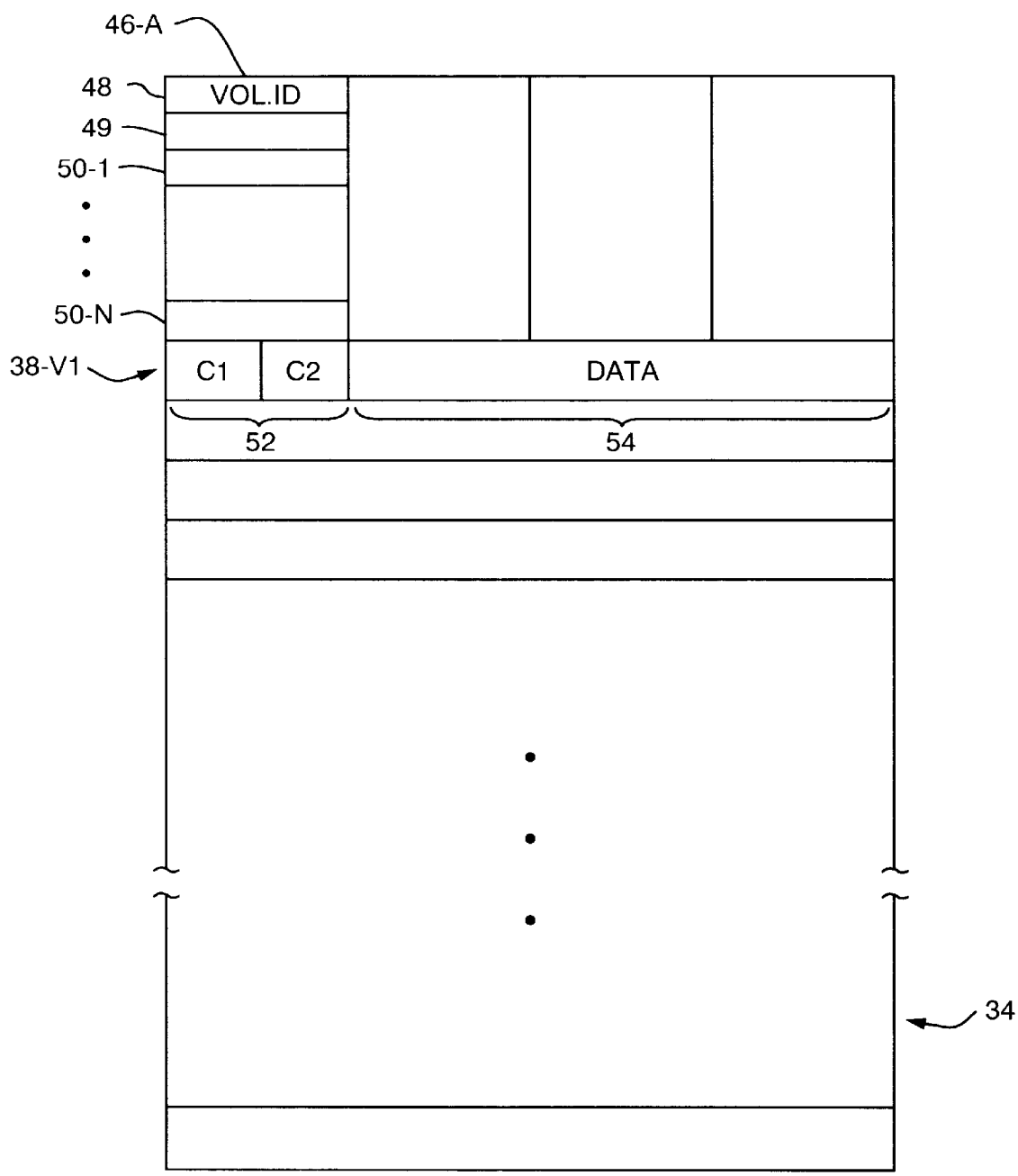
FIG. 5 is a further diagrammatic illustration of the cache memory of FIG. 4.

Software "counters" are used to achieve the necessary operational flow control. For this purpose, each slot in the cache's data section (refer now to FIG. 5), using slot 38-V1 as exemplary, has a header portion 52 and a track portion 54. The data is written to the track portion. The header portion is for administrative use and contains two (or more) counter fields, C1 and C2 (one corresponding to each channel which writes through that particular slot location). The counter fields are preferably of multiple bits (e.g., eight) in length. The operation and use of the counters will be explained. To facilitate discussion, let us designate the counter C1 as the counter corresponding to SA-1 and the counter in field C2 as the counter corresponding to SA-M. In turn, let us refer to the count of counter C1 as CTC1 and the count of counter C2 as CTC2 (the count of a counter being the value of the bits in the counter field).

Initially, the counts are set to zero, before any data is written to the associated cache slot. When a first SA, for example, SA-1, receives a write message and is ready to write to cache, it first takes charge of the slot and sets an in-use flag (not shown) which locks out access to that slot by other controllers (be they SA's or DA's) until it is finished operation. Next the SA examines the header portion of the indicated cache slot and, determining both counters are set to zero, it writes its data to the slot and increments (i.e., increases by 1) the count CTC1. It then resets the in-use flag.

One of two write situations can occur next. Either the next write operation to that slot location 38-V1 will be attempted by SA-1 (in response to another write command being received) or it will be tried by another SA, such as SA-M. Assume first that the next write operation attempt comes from SA-M. SA-M first sets the in-use flag to lock out access to that slot by other controllers (be they SA's or DA's) until it is finished operation. It then examines the counters C1 and C2 and determines their counts are out of balance: CTC1 is 1 and CTC2 is 0. Because the count CTC1 in the "opposite" counter C1 is greater than the count CTC2 in the counter C2 associated with this SA, the SA "knows" the data has already been cached by another controller and it does not continue with the write operation, but it does decrement the count in the other counter, C1 (in this example, resetting it to 0). It then resets the in-use flag .

Assume next that the second write operation attempt comes, instead, from the same SA, SA-1, that had executed the first cache write. (I.e., there are two consecutive writes to the same cache slot from the same SA.) SA-1 examines the counters, determines that CTC1 is greater than or equal to CTC2 and determines it can proceed with the write operation. The SA-1 then will set the in-use flag, write to the slot and increment CTC1, the count in counter C1 , and reset the inuse flag.

In a conventional manner, a flag is set when data is written to the cache. The disk controllers examine this flag, see that data is waiting in the cache to be stored on their drives, retrieve that data and record it on their drives. The flag is then reset, indicating the cache slot may be reused if it is needed. Cache management software, which is not part of the invention and of which there are many conventional examples, determines when a slot is reused.

The flag may constitute a single bit, for example, for each drive mapped to the logical volume in the cache. Setting the flag involves setting all of the bits to a preassigned condition (e.g., a logical one). Each drive controller resetts a corresponding one of the bits when it retrieves and stores the data associated with the flag. The slot then is not available for reuse—i.e., the flag is not considered reset—until all of the bits have been reset, signifying that all of the drives have stored the data.

The counters are used to indicate balance or imbalance between the controllers SA-1 and SA-M. Whenever the counts equal, the two counters are reset to zero as all balanced conditions are equal and this prevents undesired overflow.

Assume now that one of the I/O controllers (SA's) or some other component in one of the I/O channels fails. The counts produced by the other SA in the cache slots'counters will increment with each access. When repairs are effected, the host generates I/O commands to copy the data from the not-affected mirror to the to the now-restored mirror. Those commands come in an unusual pattern; this is interpreted as a reset signal and the SA resets both counters to zero. Such a command pattern may also be written in normal operation, but not very frequently. Since resetting the counters prematurely will only cause a loss of efficiency—in that one of the SA's will execute avoidable cache write operations—there is no loss in system integrity using this method of resynchronizing.

In addition to achieving the above-stated goal of improving write speed (as seen by the host), the invention also improves read performance (i.e., latency). In the best case, where fully mirrored drives are employed, the system exhibits the advantage that since the same data is recorded on two drives, a read command may be issued to whichever of the two mirrored drives is known to the host (which tracks their rotational positions) to be able to supply the data earlier.

Having thus described an exemplary embodiment of the invention and the principles of its operation and implementation, it will be readily apparent to those skilled in the art that various alterations and improvements are possible, as well as completely different embodiments, without departing from the spirit and scope of the invention. For example, the invention has been described in the context of an exemplary embodiment wherein each disk drive is mirrored by a single other disk drive (similar to RAID Level 1). However, it is possible to improve reliability still further by mirroring each drive to two or more other drives, all of which are mapped to a single logical volume label and all of which thus read and write through a common set of cache slots. Additionally, full mirroring is not necessary; the invention is useful with any arrangement that provides drive redundancy (for example, RAID Level 3 or RAID Level 5). In general, the invention is useful with any arrangement of a paired drive and a set of one or more redundant drives. Moreover, the controllers may be single or multi-ported with respect to the drives and the drives may be single or multi-ported, the latter allowing two or more controllers to access a single drive so that a drive controller failure will not prevent access to the drive. The flag mechanism by which the controllers pass status information to one another can be replaced by other communication architectures, as well, as is conventionally known. The counters are illustrated as part of a cache slot, along with a data portion of the slot; however, the counters may be maintained elsewhere in the cache or even outside the cache; they could be hardware counters if that were desired. The drives in the mass storage system are illustrated as being disk drives, which normally implies rotating magnetic media; however, the invention is in no way limited to storing data on magnetic disk drives and the disclosure and claims are intended to be understood to use disk drives to illustrate one convenient and common form of storage only, other forms of storage being substitutable. Separate drive and input/output controllers are illustrated; note, however, that this is a function description and that physically they may or may not be entirely separate hardware. Thus, the invention is limited only as required by the following claims and equivalents thereto.

What is claimed is:

1. For use in conjunction with a host data processing system which has a plurality of input/output connections for communicating with a mass storage system, a mass storage system comprising:

a. an input/output controller for each of the input/output connections of the host through which the mass storage system is to receive data from the host;

b. a cache memory;

c. a plurality of drives including media for storing data;

d. each drive operatively interconnected with a drive controller' e. each drive being paired with another drive as a mirror drive;

f. the paired mirrored drives being assigned a common logical volume address but being seen by the host as two distinct drives, each addressable via a different input/output connection;

g. in the cache memory, a dynamically allocable slot assigned to the logical volume and including at least a portion for holding cached read/write data;

h. first and second counters;

i. means for incrementing the count corresponding to one of the input/output controllers when an input/output controller examines the counters and determines that its corresponding counter is greater than or equal to the count corresponding to another input/output controller and completes a write operation to the dynamically allocable slot;

j. means for decrementing the count corresponding to one of the input/output controllers when an input/output controller examines the counters and determines that its corresponding counter is less than the count corresponding to another input/output controller and not continuing with a write operation;

k. said input/output controller generating a indicium indicating that it is writing said data to said cache slot; and l. in response to the generating of said indicium, the disk drives assigned to said logical volume reading said data from the cache slot and writing said data to their respective drives.

2. The mass storage system of claim 1, further comprising:

in the cache memory, a storage area for each input/output controller to allow each input/output controller to store messages from other input/output controllers.

3. The mass storage system of claim 2, wherein each input/output controller monitors its storage area in order to determine subsequent input/output controller operations in response to the messages.

4. The mass storage system of claim 2, wherein each message includes an identifier for one of the logical volume addresses.

5. In a computer storage system comprising a plurality of storage devices, each of the storage devices being paired with another storage device to form a mirrored pair, a cache memory, and one or more first and second adapters, a method for writing data to the mirrored pair of storage devices, comprising the steps of:

executing a pair of write operations to the first adapters to eventually write data to the mirrored storage devices;

assigning a cache slot in the cache memory to a logical volume, wherein the mirrored pair of storage devices is assigned to the logical volume;

setting, an indicium in the cache memory to prevent access to the cache slot;

examining first and second counters to determine if the value of the first and second counters are equal, wherein each counter corresponds to one of the first and second adapters;

if the first and second counters are equal, writing the contents of the first write operation from a first adapter to the cache slot; and determining if the contents of the second write operation should be written to the cache slot.

6. The method of claim 5, further comprising the steps of:

resetting the indicium to allow access to the cache slot; and incrementing the first counter.

7. The method of claim 6, further comprising the steps of:

prior to determining if said second write operation should be written to the cache slot, examining the first and second counters;

if the first counter is greater than or equal to the second counter, setting the indicium to prevent access to the cache slot;

writing the contents of the second write operation to the cache slot; and setting the indicium to allow access to the cache slot; and incrementing the first counter.

8. The method of claim 6, further comprising the steps of:

prior to determining if said second write operation should be written to the cache slot, examining the first and second counters; and if the first counter is less than the second counter, decrementing the first counter.

9. The method of claim 7 or 8, further comprising the steps of:

if the first and second counters are equal, setting the value of the first and second counters to zero.

10. The method of claim 6, further comprising the step of:

writing the contents of the cache slot to the mirrored pair of storage devices.

11. The method of claim 10, further comprising the step of:

in response to a failure of one of the adapters, copying the contents of one of the mirrored pair of storage devices to the other storage device in the mirrored pair; and setting the value of the first and second counters to zero.

* * * * *